(12) United States Patent
Houck et al.

(10) Patent No.: US 11,920,979 B2
(45) Date of Patent: Mar. 5, 2024

(54) OPTICAL MEASUREMENT DEVICE INCLUDING INTERNAL SPECTRAL REFERENCE

(71) Applicant: VIAVI Solutions Inc., San Jose, CA (US)

(72) Inventors: William D. Houck, Santa Rosa, CA (US); Valton Smith, Novato, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 21 days.

(21) Appl. No.: 17/653,299

(22) Filed: Mar. 3, 2022

(65) Prior Publication Data

US 2022/0187124 A1 Jun. 16, 2022

Related U.S. Application Data

(63) Continuation of application No. 16/947,849, filed on Aug. 20, 2020, now Pat. No. 11,287,317.

(60) Provisional application No. 62/892,268, filed on Aug. 27, 2019.

(51) Int. Cl.
*G01J 3/02* (2006.01)
*G01J 3/10* (2006.01)
(Continued)

(52) U.S. Cl.
CPC .......... *G01J 3/0205* (2013.01); *G01J 3/0202* (2013.01); *G01J 3/0256* (2013.01); *G01J 3/0272* (2013.01);
(Continued)

(58) Field of Classification Search
CPC ...... G01J 3/0205; G01J 3/0202; G01J 3/0256; G01J 3/0272; G01J 3/0291; G01J 3/0297;
(Continued)

(56) References Cited

U.S. PATENT DOCUMENTS 5,386,295 A 1/1995 Switalski et al.
7,003,075 B2 * 2/2006 Miyake .................... G01J 3/12
378/70
(Continued)

FOREIGN PATENT DOCUMENTS

CN 101983329 A 3/2011
CN 102244714 A 11/2011
(Continued)

OTHER PUBLICATIONS

International Search Report and Written Opinion for Application No. PCT/US2020/070441, dated Nov. 9, 2020, 14 pages.

*Primary Examiner* — Michelle M Iacoletti
*Assistant Examiner* — Noah J. Haney
(74) *Attorney, Agent, or Firm* — Harrity & Harrity, LLP (57) ABSTRACT

An optical measurement device may include a light source; an emission optic configured to direct a first portion of light generated by the light source to a measurement target; a collection optic configured to receive light from the measurement target; an optical conduit configured to direct a second portion of light generated by the light source to a spectral reference; the spectral reference; a sensor; and a filter. A first portion of the filter may be provided between the collection optic and a first portion of the sensor. A second portion of the filter may be provided between the spectral reference and a second portion of the sensor.

22 Claims, 5 Drawing Sheets

(51) Int. Cl.
*G01J 3/443* (2006.01)
*G01N 21/27* (2006.01)
*G01N 21/47* (2006.01)

(52) U.S. Cl.
CPC ........... *G01J 3/0291* (2013.01); *G01J 3/0297* (2013.01); *G01J 3/10* (2013.01); *G01N 21/274* (2013.01); *G01N 21/4738* (2013.01); *G01J 3/443* (2013.01)

(58) Field of Classification Search
CPC ...... G01J 3/10; G01J 3/443; G01J 3/45; G01J 3/453; G01J 3/4531; G01J 3/4532; G01N 21/274; G01N 21/4738
USPC ......................................................... 356/451
See application file for complete search history.

(56) References Cited

U.S. PATENT DOCUMENTS

| | | | |
|---|---|---|---|
| 8,193,500 B2 | 6/2012 | Iwasaki et al. | |
| 9,234,839 B2 | 1/2016 | Hruska | |
| 9,323,013 B2 * | 4/2016 | Shao | G02B 6/4246 |
| 9,557,574 B2 | 1/2017 | Mceldowney | |
| 10,359,505 B2 | 7/2019 | Buettgen et al. | |
| 2001/0055116 A1 | 12/2001 | Maczura et al. | |
| 2007/0236692 A1 | 10/2007 | Schebesta et al. | |
| 2012/0013905 A1 | 1/2012 | Nozawa | |
| 2015/0198522 A1 | 7/2015 | Wei et al. | |
| 2017/0023410 A1 * | 1/2017 | Nishiwaki | G01J 3/0208 |
| 2017/0261425 A1 | 9/2017 | Deliwala | |
| 2019/0128734 A1 | 5/2019 | Arbore et al. | |
| 2019/0187347 A1 * | 6/2019 | Bilger | G02B 5/281 |
| 2020/0232910 A1 * | 7/2020 | Meng | B01L 3/502715 |
| 2021/0063241 A1 | 3/2021 | Houck et al. | |

FOREIGN PATENT DOCUMENTS

| | | |
|---|---|---|
| CN | 106104296 A | 11/2016 |
| CN | 108778098 A | 11/2018 |
| DE | 102007061213 A1 | 6/2009 |
| EP | 2267420 A1 | 12/2010 |
| JP | 2006222346 A | 8/2006 |
| TW | 201804135 A | 2/2018 |

* cited by examiner

OPTICAL MEASUREMENT DEVICE INCLUDING INTERNAL SPECTRAL REFERENCE

RELATED APPLICATIONS

This application is a continuation of U.S. patent application Ser. No. 16/947,849, filed Aug. 20, 2020, which claims priority to U.S. Provisional Patent Application No. 62/892,268, filed on Aug. 27, 2019, and entitled "OPTICAL MEASUREMENT DEVICE INCLUDING INTERNAL SPECTRAL REFERENCE," the contents of each of which are incorporated by reference herein in their entireties.

BACKGROUND

An optical measurement device may be utilized to capture information. For example, the optical measurement device may capture information relating to a set of electromagnetic frequencies. The optical measurement device may include a set of sensor elements (e.g., optical sensors, spectral sensors, and/or image sensors) that capture the information. For example, an array of sensor elements may be utilized to capture information relating to multiple frequencies. The sensor element array may be associated with an optical filter. The optical filter may include one or more channels that respectively pass particular frequencies to sensor elements of the sensor element array.

SUMMARY

In some implementations, an optical measurement device includes a light source; an emission optic configured to direct a first portion of light generated by the light source to a measurement target; a collection optic configured to receive light from the measurement target; an optical conduit configured to direct a second portion of light generated by the light source to a spectral reference; the spectral reference; a sensor; and a filter, wherein: a first portion of the filter is provided between the collection optic and a first portion of the sensor; and a second portion of the filter is provided between the spectral reference and a second portion of the sensor.

In some implementations, an optical device includes a light source configured to generate light that includes a first portion of light and a second portion of light; a spectral reference configured to reflect the second portion of light; an optical sensor comprising a first optical sensor portion and a second optical sensor portion; and an optical filter comprising a first optical filter portion and a second optical filter portion, wherein: the first optical filter portion is configured to receive a first light beam associated with the first portion of light that has been reflected by a measurement target and to filter and provide the first light beam to the first optical sensor portion, and the second optical filter portion is configured to receive a second light beam associated with the second portion of light that has been reflected by the spectral reference and to filter and provide the second light beam to the second optical sensor portion.

In some implementations, a user device includes an optical measurement package, comprising: a light source; a spectral reference configured to reflect a percentage of a portion of light generated by the light source to a portion of a filter; a sensor; and a filter, wherein the portion of the filter is provided between the spectral reference and a portion of the sensor.

DETAILED DESCRIPTION

The following detailed description of example implementations refers to the accompanying drawings. The same reference numbers in different drawings may identify the same or similar elements. The following description uses a spectrometer as an example. However, the techniques, principles, procedures, and methods described herein may be used with any sensor, including but not limited to other optical sensors and spectral sensors.

An optical measurement device may use a light source, such as a light emitting diode (LED), to illuminate a measurement target (also referred to as a sample under test (SUT)) to measure the measurement target. Light from the light source may reflect off the measurement target and may be received by a sensor, such as an image sensor, of the optical measurement device, which allows the optical measurement device to measure the measurement target. Although the optical measurement device may be initially calibrated (e.g., after assembly) to obtain accurate measurements of such measurement targets, the optical measurement device may subsequently become uncalibrated. For example, the light source may experience a shift in spectral power distribution when operating at a temperature that is different from a reference temperature at which the optical measurement device was initially calibrated. As another example, over an operable lifetime of the optical measurement device, the light source may experience a shift in spectral power distribution from an initial spectral power distribution (e.g., a performance of the light source may degrade over time).

To account for changes to the spectral power distribution of the light source, and an associated effect on measurement accuracy, the optical measurement device may be periodically recalibrated. For example, in a laboratory setting, the optical measurement device may use the light source to illuminate an external spectral reference, such as a reflectance standard, and the optical measurement device may be recalibrated based on a reading of reflected light associated with the external spectral reference. However, as optical measurement devices are increasingly incorporated into mobile form-factors, such as in standalone mobile form-factors or in a portion of a mobile device (e.g., a mobile user device, such as a mobile phone), an availability of external spectral references may be lacking. Moreover, bringing the optical measurement device to a laboratory setting for periodic recalibration may be inconvenient or infeasible, which may result in poorly calibrated optical measurement devices providing incorrect measurement determinations. Furthermore, even when possible, laboratory-based recalibrations may be performed infrequently, which may result in small amounts of spectral power distribution drift of the light source between recalibration procedures. Although such drifts may be small, such drifts may result in incorrect determinations in an optical measurement device that relies on a high degree of accuracy in measurements.

Some implementations described herein provide an optical measurement device with an internal spectral reference. For example, the optical measurement device may include an internal spectral reference for wavelength and/or illumination calibration. The spectral reference may be disposed within a portion of a path of light emission by a light source of the optical measurement device to enable capture and reflection of a portion of light emitted by the light source when the optical measurement device is measuring a measurement target. Accordingly, the optical measurement device may obtain a spectral reference reading every time the optical measurement device obtains a measurement reading associated with the measurement target, and therefore the optical measurement device may use the spectral reference reading to determine an accurate measurement of the measurement target.

In this way, the optical measurement device may be recalibrated for every measurement determined by the optical measurement device, which increases an accuracy of the optical measurement device's measurements throughout the operating life of the optical measurement device. This eliminates the need for an external spectral reference and/or the need to periodically recalibrate the optical measurement device in a laboratory setting. Further, because a reference spectral reading is obtained with each measurement reading associated with the measurement target, an accurate measurement of the measurement target may be determined regardless of changing conditions (e.g., spectral power distribution drift of the light source, temperature changes of the optical measurement device, and/or the like) associated with operating the optical measurement device.

Figure 1:
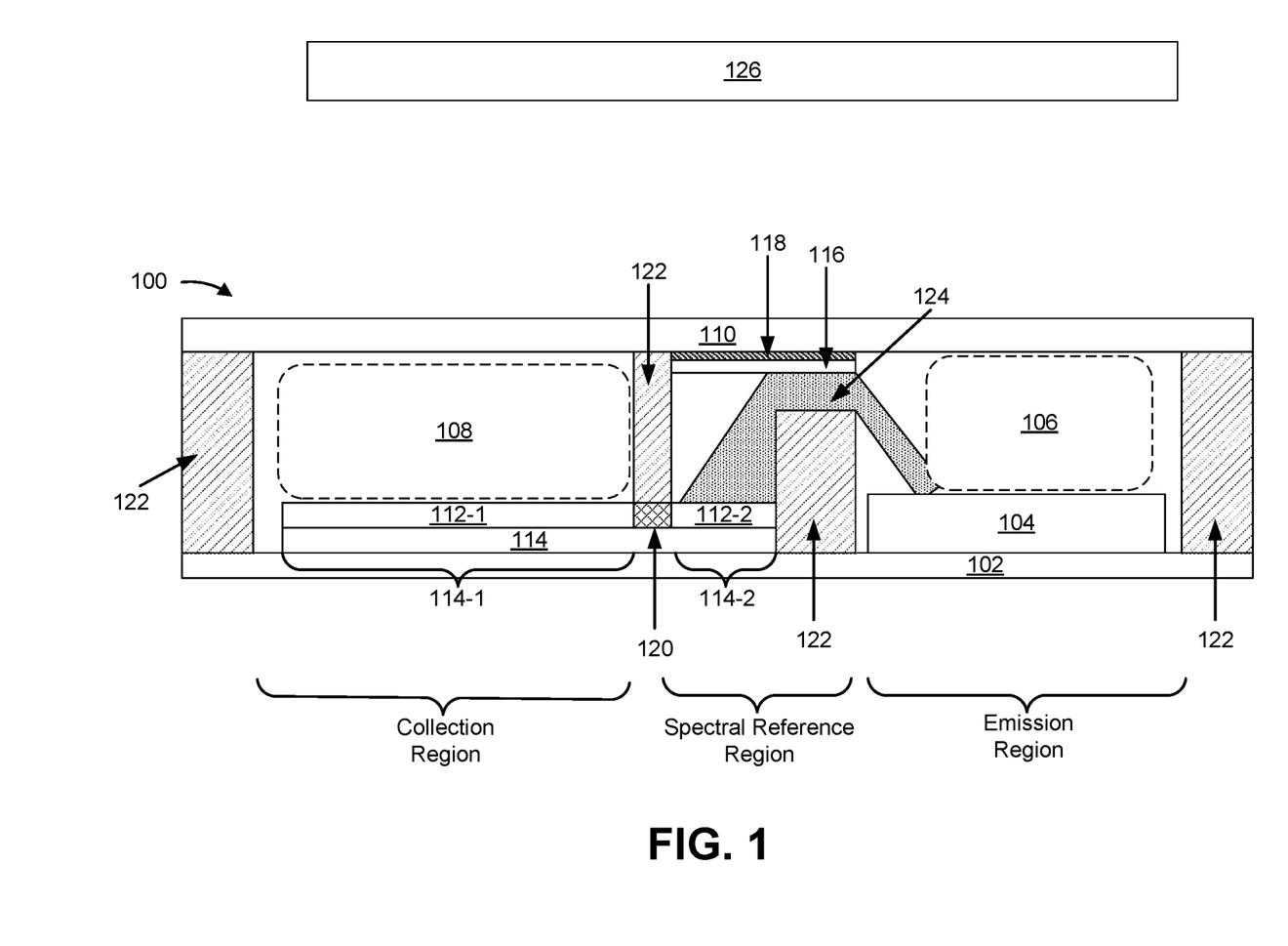
FIG. 1 is a diagram illustrating a side-view of an example optical measurement device described herein.

FIG. 1 is a diagram illustrating a side-view of an example optical measurement device 100. As shown in FIG. 1, example optical measurement device 100 includes a printed circuit board (PCB) 102, a light source 104, an emission optic 106, a collection optic 108, a cover component 110, an optical filter 112 (e.g., comprising a first optical filter portion 112-1 and a second optical filter portion 112-2), a sensor 114 (e.g., comprising a first sensor portion 114-1 and a second sensor portion 114-2), a spectral reference 116, a backing component 118, a blocking component 120, one or more barriers 122, and an optical conduit 124. As shown in FIG. 1, the example optical measurement device 100 may include three regions: an emission region (e.g., that is associated with the light source 104 and/or the emission optic 106), a collection region (e.g., that is associated with the collection optic 108, the first optical filter portion 112-1, and/or the first sensor portion 114-1), and a spectral reference region (e.g., that is associated with the second optical filter portion 112-2, the second sensor portion 114-2, the spectral reference 116, and/or the optical conduit 124). The example optical measurement device 100 may be configured to optically measure a measurement target 126 (e.g., that is external to the example optical measurement device 100, as shown in FIG. 1).

The light source 104 and the sensor 114 may be attached and/or mounted to the PCB 102. The light source 104 may include a device capable of generating light. For example, the light source 104 may include a light emitting diode (LED), such as a phosphor LED. The light source 104 may be configured to provide light in a particular range (e.g., associated with visible light, infrared light, and/or the like). For example, the phosphor LED may provide light in a range of 700 nanometers to 1100 nanometers, which may enable sensing (e.g., by the sensor 114) based on light in the near-infrared (NIR) range.

In some implementations, the light source 104 may include a plurality of LEDs. In such a case, a first LED, of the plurality of LEDs, may be associated with a different spectral range than a second LED of the plurality of LEDs. This may enable the addressing of narrow spectral ranges using a plurality of LEDs, rather than addressing a wide spectral range using a single LED.

In some implementations, the light source 104 may include a modulated LED. For example, the light source 104 may include a single modulated LED or a plurality of modulated LEDs. When the light source 104 includes one or more modulated LEDs, the example optical measurement device 100 or a device associated with the example optical measurement device 100 may modulate a power supply of the light source 104. Using a modulated LED may enable driving the LED to a higher power than a continuous-wave LED. Furthermore, modulation may improve signal to noise properties of sensing performed using light from the modulated LED.

The light generated by the light source 104 may emit toward the emission optic 106 and the optical conduit 124. A first portion of the light may be received by the emission optic 106 and a second portion of the light may be received by the optical conduit 124. As described in further detail herein, the first portion of light may emit from the emission region of the example optical measurement device 100, may be reflected and/or transflected by the measurement target 126, and may be received by the collection region of the example optical measurement device 100 (e.g., to optically measure the measurement target 126) and the second portion of light may transmit from the emission region of the example optical measurement device 100 to the spectral reference region of the example optical measurement device 100 (e.g., to provide a reference measurement for improving measurement accuracy of the measurement target 126).

The emission optic 106 may be proximate to the light source 104 (e.g., attached and/or mounted to the light source 104, close to the light source 104, and/or the like) to allow the emission optic 106 to receive the first portion of light generated by the light source 104. The emission optic 106 may include a lens, a window, an optical diffuser, an optical filter, an aperture stop, a reflective optical element, a diffractive optical element, a refractive optical element, and/or the like. In some implementations, the emission optic 106 may be configured to receive and to direct the first portion of light emitted by the light source 104 toward the measurement target 126.

The first portion of light may transmit from the emission optic 106 to the measurement target 126 via the cover component 110. The cover component 110 may include a lens, a window, an optical diffuser, an optical filter, an aperture stop, a reflective optical element, a diffractive optical element, a refractive optical element, and/or the like. In some implementations, the cover component 110 may be configured to receive and to direct the first portion of light toward the measurement target 126.

The first portion of light (e.g., after transmitting from the light source 104 and via the emission optic 106 and/or and the cover component 110) may transmit to the measurement target 126 (e.g., through the air) and may be reflected and/or transflected by the measurement target 126. The cover component 110 may be configured to receive the reflected and/or transflected first portion of light (herein after referred to as "measurement light") and to direct the measurement light to the collection optic 108.

In some implementations, the collection optic 108 may include a lens, a window, an optical diffuser, an optical filter, an aperture stop, a reflective optical element, a diffractive optical element, a refractive optical element, and/or the like. The collection optic 108 may be configured to receive the measurement light (e.g., from the cover component 110) and to direct the measurement light to the optical filter 112. For example, the collection optic 108 may be configured to receive and direct the measurement light to the first optical filter portion 112-1.

Optical filter 112 may include a spectral filter, a multi-spectral filter, an optical interference filter, a bandpass filter, a blocking filter, a long-wave pass filter, a short-wave pass filter, a dichroic filter, a linear variable filter (LVF), a circular variable filter (CVF), a Fabry-Perot filter (e.g., a Fabry-Perot cavity filter), a Bayer filter, a plasmonic filter, a photonic crystal filter, a nanostructure and/or metamaterial filter, an absorbent filter (e.g., comprising organic dyes, polymers, glasses, and/or the like), and/or the like. The optical filter 112 may pass one or more wavelengths of light for sensing by sensor 114. In some implementations, the optical filter 112 may include multiple, different filters that are configured to pass respective spectral ranges to the sensor 114.

As shown in FIG. 1, optical filter 112 may comprise the first optical filter portion 112-1 and the second optical filter portion 112-2. The first optical filter portion 112-1, which is associated with the collection region of the example optical measurement device 100, may be configured to receive the measurement light transmitted by the emission optic 106 and may pass one or more wavelengths of the measurement light to the sensor 114. For example, the first optical filter portion 112-1 may be configured to receive the measurement light and may pass one or more wavelengths of the measurement light to the first sensor portion 114-1. The second optical filter portion 112-2, which is associated with the spectral reference region of the example optical measurement device 100, is described in further detail herein (e.g., in relation to the second portion of light).

Sensor 114 includes a device capable of performing a measurement of light directed toward sensor 114 (e.g., via the first optical filter portion 112-1 and/or the second optical filter portion 112-2), such as an optical sensor, a spectral sensor, an image sensor, and/or the like. Sensor 114 may utilize one or more sensor technologies, such as a complementary metal-oxide-semiconductor (CMOS) technology, a charge-coupled device (CCD) technology, and/or the like. In some implementations, sensor 114 may include multiple sensor elements (e.g., an array of sensor elements, also referred to herein as a sensor array), each configured to obtain information. For example, a sensor element may provide an indication of intensity of light that is incident on the sensor element (e.g., active/inactive or a more granular indication of intensity).

As shown in FIG. 1, sensor 114 may comprise the first sensor portion 114-1 and the second sensor portion 114-2. The first sensor portion 114-1, which is associated with the collection region of the example optical measurement device 100, may be configured to receive and measure the measurement light filtered by the first optical filter portion 112-1. The second sensor portion 114-2, which is associated with the spectral reference region of the example optical measurement device 100, is described in further detail herein (e.g., in relation to the second portion of light).

As described above, the second portion of the light generated by the light source 104 may be received by the optical conduit 124. The optical conduit 124 may be proximate to the light source 104 (e.g., attached and/or mounted to the light source 104, close to the light source 104 to allow the optical conduit 124 to receive the second portion of the light generated by the light source 104, and/or the like). The optical conduit 124 may include a light guide, a light pipe, and/or any other type of optical structure to transmit light. In some implementations, the optical conduit 124 may be configured to receive and to transmit the second portion of light emitted by the light source 104 to the spectral reference 116.

The spectral reference 116 may include a reflector that reflects a particular percentage of light (e.g., 99%, 80%, 50%, 20%, 10%, and/or the like) that falls incident on the reflector. In some implementations, spectral reference 116 may include a reflection standard that conforms to a standard, such as the Spectralon reflection standard (SRS). Additionally, or alternatively, the spectral reference 116 may be partially transmissive and/or partially absorbing, such that the spectral reference 116 reflects only the particular percentage of light that falls incident on the spectral reference 116 and is not transmitted and/or absorbed by the spectral reference 116. In this way, the spectral reference 116 may be configured to reflect the second portion of light (e.g., at the particular percentage) toward the optical filter 112 (e.g., the second optical filter portion 112-2).

In some implementations, the backing component 118 may be proximate to the spectral reference 116 (e.g., attached and/or mounted to the spectral reference 116, disposed on the spectral reference 116, and/or the like). In some implementations, the backing component 118 may be configured to absorb some or all of the second portion of light that is not reflected and/or transmitted by the spectral reference 116 and/or is not directed toward the optical filter 112. Additionally, or alternatively, the backing component 118 may be configured to reflect some or all of the second portion of light that is not transmitted and/or absorbed by the spectral reference 116 and/or is not directed toward the optical filter 112. In this way, the backing component 118 may prevent some or all of the second portion of the light transmitting to the measurement target 126 (e.g., via the cover component 110) and interfering with the measurement of the measurement target 126 by the example optical measurement device 100.

In some implementations, the optical conduit 124 may be further configured to transmit the reflected second portion of light (hereinafter referred to as the "reference light") to the second optical filter portion 112-2. Alternatively, the reference light may transmit to the second optical filter portion 112-2 via the air, another optical conduit, and/or the like.

The second optical filter portion 112-2 may be configured to receive the reference light and may pass one or more wavelengths of the reference light to the sensor 114. For example, the second optical filter portion 112-2 may be configured to receive the reference light and may pass one or more wavelengths of the reference light to the second sensor portion 114-2. The second sensor portion 114-2 may be configured to receive and measure the reference light filtered by the second optical filter portion 112-2.

In some implementations, as shown in FIG. 1, the first optical filter portion 112-1 and the second optical filter portion 112-2 may be separated by the blocking component 120. The blocking component 120 may absorb and/or reflect light and may be configured to prevent and/or reduce a likelihood of light received by the collection region of the example optical measurement device 100 and light received by the spectral reference region of the example optical measurement device 100 interfering with each other. For example, the blocking component 120 may be configured to prevent the reference light from transmitting to the first sensor portion 114-1 via the second optical filter portion 112-2 and/or the second sensor portion 114-2. As another example, the blocking component 120 may be configured to prevent the measurement light from transmitting to the second sensor portion 114-2 via the first optical filter portion 112-1 and/or the first sensor portion 114-1.

In some implementations, the one or more barriers 122 may be provided between the regions of the example optical measurement device 100. A barrier 122 may absorb and/or reflect light and may be configured to prevent and/or reduce a likelihood of light associated with one region of the example optical measurement device 100 transmitting to another region of the example optical measurement device 100. For example, as shown in FIG. 1, the optical conduit 124 may be disposed on a barrier 122 that may be configured to prevent the reference light associated with the spectral reference region from transmitting from the spectral reference region to the emission region. As another example, a barrier 122 may be disposed on the blocking component 120 and may be configured to prevent the measurement light from transmitting from the collection region to the spectral reference region and/or may be configured to prevent the reference light from transmitting from the spectral reference region to the collection region. In this way, the one or more barriers 122 may prevent and/or reduce a likelihood that light associated with one region will interact, interfere, and/or the like, with light associated with another region.

In some implementations, the cover component 110 may be attached and/or mounted to at least one of the one or more barriers 122, which may be attached and/or mounted to the PCB 102. In this way the cover component 110, the at least one barrier 122, and the PCB 102 may enclose one or more of the other components, such as the light source 104, the optical filter 112, the sensor 114, the spectral reference 116, and/or the like (e.g., as discussed herein) to form a package (e.g., an optical measurement package). Accordingly, at least some of the components of the example optical measurement device 100 may be environmentally sealed within the package of the optical measurement device to enable measurements to be performed without interference from other light, from environmental-based degradation (e.g., a presence of dust, a chemical change to the reference standard, and/or the like), and/or the like.

In some implementations, the emission optic 106, the collection optic 108, and/or the cover component 110 may comprise a single, monolithic optic structure. The optic structure may include one or more different portions (e.g., a collection portion, a spectral reference portion, an emission portion, and/or the like), where each portion is respectively configured to facilitate emission, collection, reflection, and/or the like, of light (e.g., as described herein). Such an optic structure may simplify assembly of the example optical measurement device 100 and/or ensure an integrity of the optical measurement package.

As indicated above, FIG. 1 is provided as an example. Other examples may differ from what is described with regard to FIG. 1.

Figure 2:
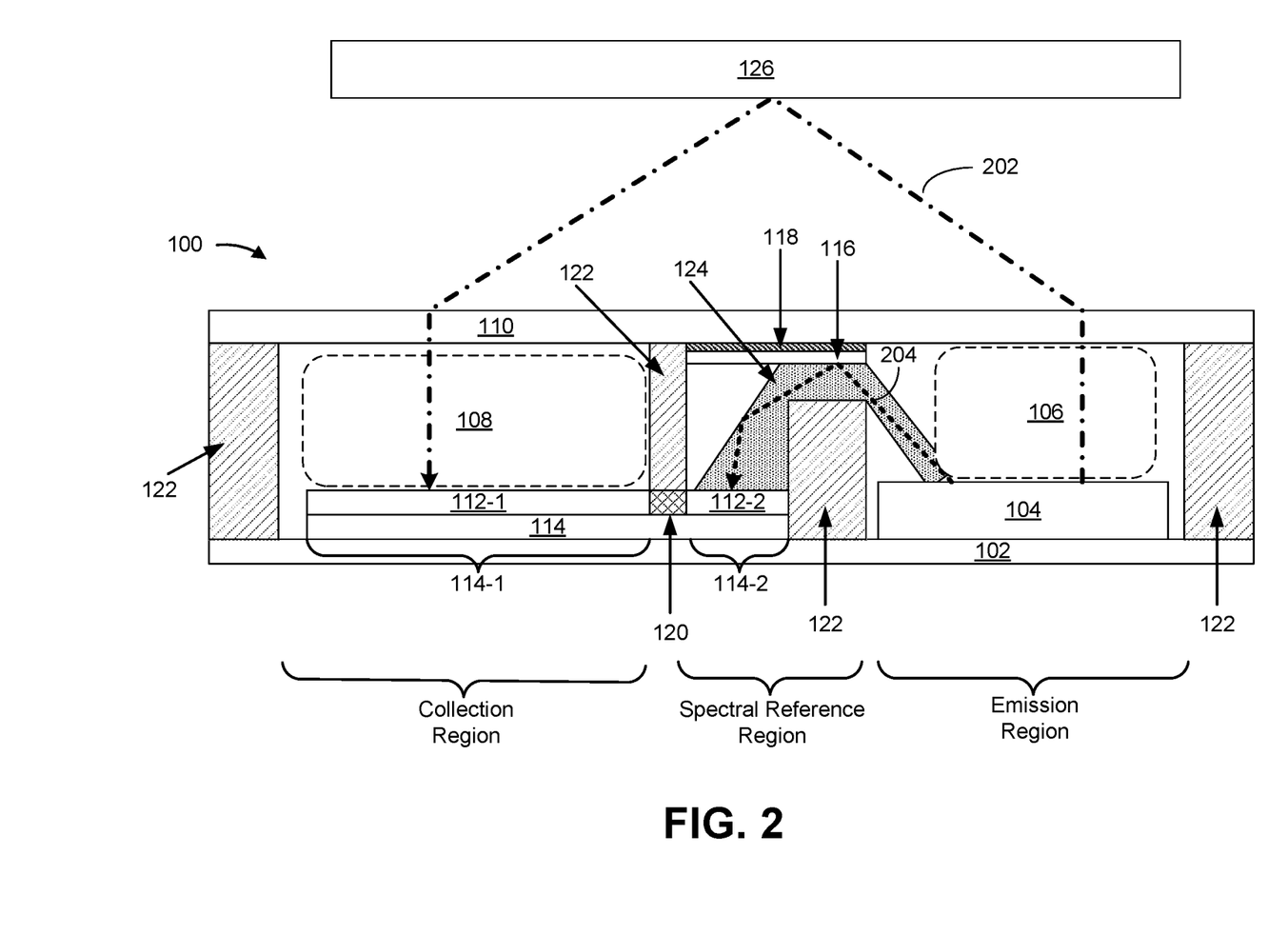
FIG. 2 is a diagram illustrating how one or more light beams transmit through the example optical measurement device described herein.

FIG. 2 is a diagram illustrating how one or more light beams transmit through the example optical measurement device 100. As shown in FIG. 2, a first light beam 202 may be associated with the first portion of light (e.g., described above) and may emit from the light source 104 and transmit through the emission optic 106 and the cover component 110 to the measurement target 126. The first light beam 202 may be reflected and/or transflected by the measurement target 126 and may transmit through the cover component 110 and the collection optic 108 to the first optical filter portion 112-1 (e.g., as part of the measurement light). The first light beam 202 may be filtered by the first optical filter portion 112-1, and one or more wavelengths of the first light beam 202 may be passed to the first sensor portion 114-1. The first sensor portion 114-1 may measure the one or more wavelengths of the first light beam 202.

As further shown in FIG. 2, a second light beam 204 may be associated with the second portion of light (e.g., as described above) and may emit from the light source 104 and transmit through the optical conduit 124 to the spectral reference 116. The second light beam 204 may be reflected by the spectral reference 116 and transmit through the optical conduit 124 to the second optical filter portion 112-2 (e.g., as part of the reference light). The second light beam 204 may be filtered by the second optical filter portion 112-2, and one or more wavelengths of the second light beam 204 may be passed to the second sensor portion 114-2. The second sensor portion 114-2 may measure the one or more wavelengths of the second light beam 204.

In this way, the example optical measurement device 100 is able to contemporaneously obtain an optical reading associated with the measurement target 126 and an optical reading associated with the spectral reference 116. A control device (not shown in FIG. 2) associated with the example optical measurement device 100 may use the optical reading associated with the spectral reference 116 to analyze the optical reading associated with the measurement target 126 to determine an accurate optical measurement of the measurement target 126. Additionally, or alternatively, the control device may recalibrate the example optical measurement device 100 based on the optical reading associated with the spectral reference 116 to allow the example optical measurement device 100 to accurately determine one or more additional optical measurements of the measurement target 126 based on one or more additional optical readings associated with the measurement target 126 obtained by the example optical measurement device 100.

As indicated above, FIG. 2 is provided merely as one or more examples. Other examples may differ from what is described with regard to FIG. 2.

Figure 3A:
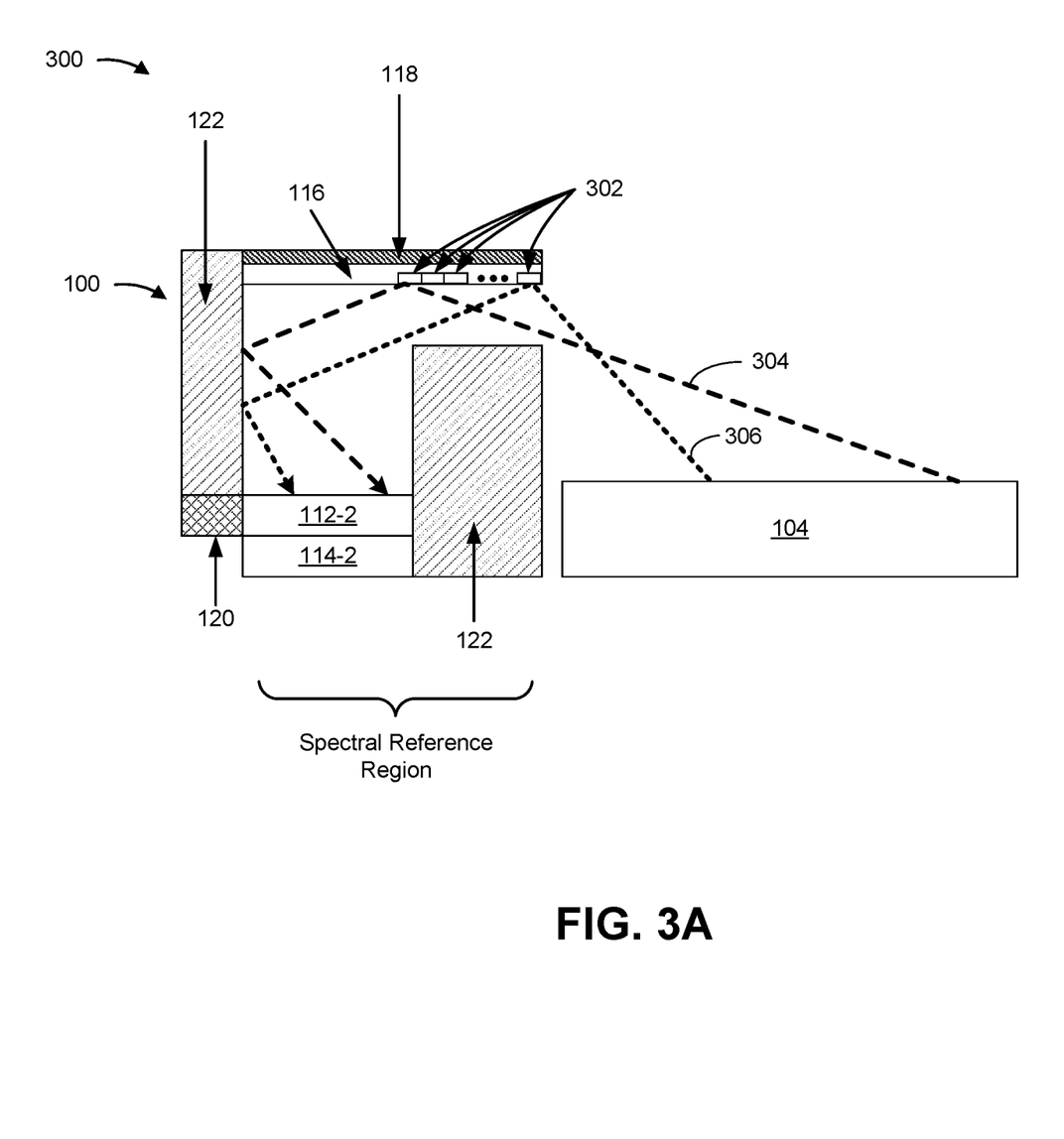
FIGS. 3A-3B are diagrams illustrating an example of alternative configurations of components of a spectral reference region of the example optical measurement device described herein.

FIGS. 3A-3B are diagrams illustrating an example 300 of alternative configurations of components of the spectral reference region of the example optical measurement device 100. As shown in FIG. 3A, the spectral reference region may not include the optical conduit 124. As further shown in FIG. 3A, the spectral reference 116 may include a plurality of spectral reference portions 302, where each spectral reference portion 302 is associated with a particular reflectivity. For example, a first spectral reference portion 302 may be associated with 99% reflectivity, a second spectral reference portion 302 may be associated with 80% reflectivity, a third spectral reference portion 302 may be associated with 60% reflectivity, and so on.

As further shown in FIG. 3A, a first light beam 304 (e.g., associated with the second portion of light) may emit from the light source 104 and transmit through the air to the spectral reference 116. The first light beam 304 may be reflected by a particular spectral reference portion 302 of the spectral reference 116 (e.g., at the reflectivity associated with the particular spectral reference portion 302) and may transmit through the air to the second optical filter portion 112-2. The first light beam 304 may be filtered by the second optical filter portion 112-2. Accordingly, one or more wavelengths of the filtered first light beam 304 may be passed to the second sensor portion 114-2, which may measure the one or more wavelengths of the filtered first light beam 304.

As further shown in FIG. 3A, a second light beam 306 (e.g., associated with the second portion of light) may emit from the light source 104 and transmit through the air to the spectral reference 116. The second light beam 306 may be reflected by a different spectral reference portion 302 of the spectral reference 116 (e.g., at the reflectivity associated with the different spectral reference portion 302) and may transmit through the air to the second optical filter portion 112-2. The second light beam 306 may be filtered by the second optical filter portion 112-2. Accordingly, one or more wavelengths of the filtered second light beam 306 may be passed to the second sensor portion 114-2, which may measure the one or more wavelengths of the filtered second light beam 306.

Figure 3B:
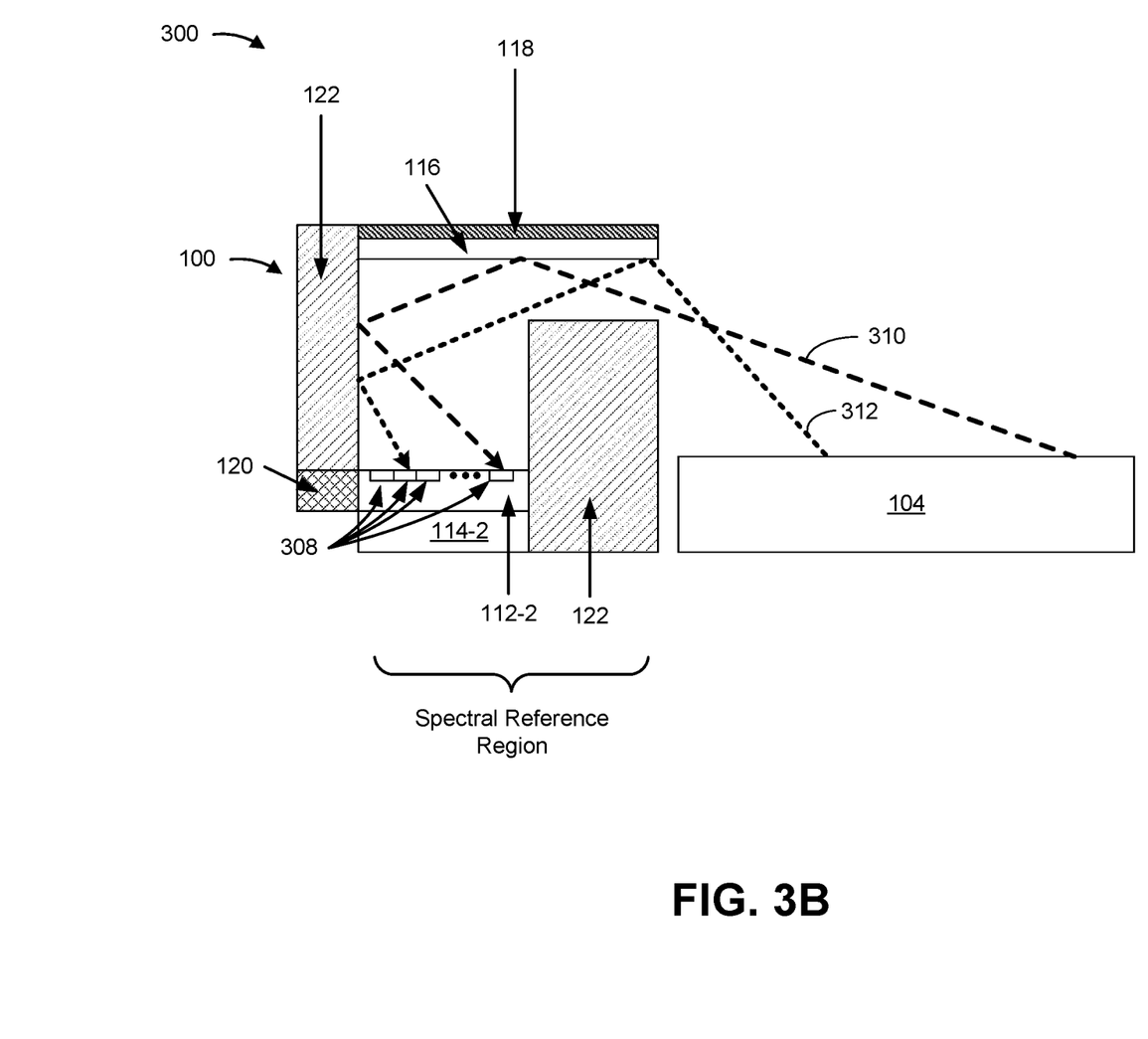

Additionally, or alternatively, as shown in FIG. 3B, the spectral reference region may not include the optical conduit 124. As further shown in FIG. 3B, the second optical filter portion 112-2 may include a plurality of reflective areas 308, where each reflective area 308 is associated with a particular reflectivity. For example, a first reflective area 308 may be associated with 99% reflectivity, a second reflective area 308 may be associated with 80% reflectivity, a third reflective area 308 may be associated with 60% reflectivity, and so on. Each reflective area 308 may be achieved by depositing a reflective coating (e.g., a neutral density coating) associated with a particular reflectivity on the second optical filter portion 112-2.

As further shown in FIG. 3B, a third light beam 310 (e.g., associated with the second portion of light) may emit from the light source 104 and transmit through the air to the spectral reference 116. The third light beam 310 may be reflected by the spectral reference 116 (e.g., at a high reflectivity, such as greater than or equal to 99%) and may transmit through the air to a particular reflective area 308 of the second optical filter portion 112-2. A portion of the third light beam 310 may be reflected by the particular reflective area 308, and a remaining portion may be filtered by the second optical filter portion 112-2. Accordingly, one or more wavelengths of the filtered third light beam 310 may be passed to the second sensor portion 114-2, which may measure the one or more wavelengths of the filtered third light beam 310.

As further shown in FIG. 3B, a fourth light beam 312 (e.g., associated with the second portion of light) may emit from the light source 104 and transmit through the air to the spectral reference 116. The fourth light beam 312 may be reflected by the spectral reference 116 (e.g., at a high reflectivity, such as greater than or equal to 99%) and may transmit through the air to a different reflective area 308 of the second optical filter portion 112-2. A portion of the fourth light beam 312 may be reflected by the different reflective area 308, and a remaining portion may be filtered by the second optical filter portion 112-2. Accordingly, one or more wavelengths of the filtered fourth light beam 312 may be passed to the second sensor portion 114-2, which may measure the one or more wavelengths of the filtered fourth light beam 312.

In this way, in either configuration shown in FIG. 3A or FIG. 3B, the example optical measurement device 100 is able to contemporaneously obtain a plurality of optical readings associated with the spectral reference 116 and varying amounts of reflectivity. Accordingly, this may increase a likelihood that a control device associated with the example optical measurement device 100 is able to determine an accurate optical measurement of the measurement target 126 based on optical readings associated with the spectral reference 116.

As indicated above, FIGS. 3A-3B are provided merely as one or more examples. Other examples may differ from what is described with regard to FIGS. 3A-3B.

Figure 4:
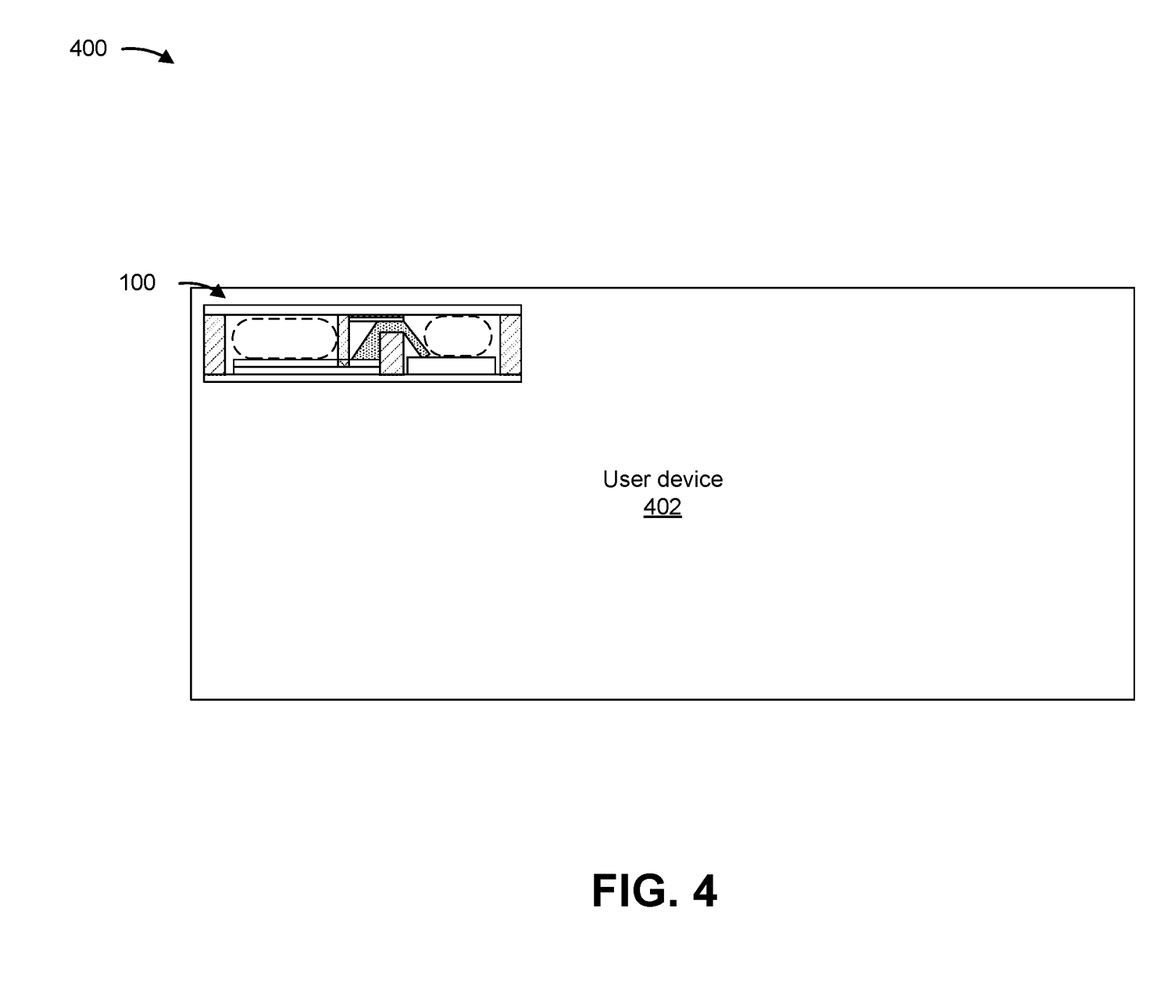
FIG. 4 is a diagram illustrating an example of a user device that includes the example optical measurement device described herein.

FIG. 4 is a diagram illustrating an example 400 of a user device 402 that may include the example optical measurement device 100. User device 402 may include, for example, a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), a spectrometer, or a similar type of device. By reducing the size of the example optical measurement device 100, the example optical measurement device 100 may be implemented in smaller user devices 402, or may have a smaller footprint in a user device 402, than an optical measurement device associated with a monolithic collection component.

As indicated above, FIG. 4 is provided as an example. Other examples may differ from what is described with regard to FIG. 4.

The foregoing disclosure provides illustration and description, but is not intended to be exhaustive or to limit the implementations to the precise form disclosed. Modifications and variations may be made in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical measurement device, comprising:
   a filter comprising a first optical filter portion and a second optical filter portion;
   a blocking component separating the first optical filter portion and the second optical filter portion;

a spectral reference comprising a plurality of spectral reference portions,
  wherein the plurality of spectral reference portions comprises:
    a first spectral reference portion associated with a first reflectivity, and
    a second spectral reference portion associated with a second reflectivity that is different from the first reflectivity; and
a light source configured to:
  emit a first light beam that is reflected by the first spectral reference portion and transmitted to the second optical filter portion, and
  emit a second light beam that is reflected by the second spectral reference portion and transmitted to the second optical filter portion.

2. The optical measurement device of claim 1, wherein the plurality of spectral reference portions further comprises:
  a third spectral reference portion associated with a third reflectivity that is different from the first reflectivity and the second reflectivity.

3. The optical measurement device of claim 1, wherein at least one of the first reflectivity or the second reflectivity is greater than 60% reflectivity.

4. The optical measurement device of claim 1, further comprising:
  a sensor comprising a first sensor portion and a second sensor portion.

5. The optical measurement device of claim 4, wherein the first light beam is filtered by the second optical filter portion to obtain a filtered first light beam, and
  wherein one or more wavelengths of the filtered first light beam are passed to the second sensor portion.

6. The optical measurement device of claim 5, wherein the second light beam is filtered by the second optical filter portion to obtain filtered second light beam, and
  wherein one or more wavelengths of the filtered second light beam are passed to the second sensor portion.

7. The optical measurement device of claim 1,
  a sensor comprising a sensor portion configured to measure one or more wavelengths of a filtered first light beam that corresponds to the first light beam.

8. The optical measurement device of claim 1, further comprising:
  a backing component that is attached or mounted to the spectral reference or disposed on the spectral reference.

9. The optical measurement device of claim 8, wherein the backing component is configured to absorb some or all of light that is not reflected or transmitted by the spectral reference.

10. The optical measurement device of claim 1, wherein the blocking component is configured to prevent or reduce one or more of the first light beam or the second light beam from transmitting to the first optical filter portion via the second optical filter portion.

11. The optical measurement device of claim 1, further comprising:
  a barrier configured to reflect the first light beam toward the second optical filter portion.

12. The optical measurement device of claim 1, further comprising:
  a barrier configured to prevent the first light beam from transmitting from a spectral reference region of the optical measurement device to a collection region of the optical measurement device.

13. The optical measurement device of claim 1, further comprising:
  a barrier disposed on the blocking component.

14. A device, comprising:
a filter comprising an optical filter portion;
a spectral reference comprising a plurality of spectral reference portions,
  wherein the plurality of spectral reference portions comprises:
    a first spectral reference portion associated with a first reflectivity, and
    a second spectral reference portion associated with a second reflectivity that is different from the first reflectivity; and
a light source configured to:
  emit a first light beam that is reflected by the first spectral reference portion and transmitted to the optical filter portion, and
  emit a second light beam that is reflected by the second spectral reference portion and transmitted to the optical filter portion.

15. The device of claim 14, wherein the plurality of spectral reference portions further comprises:
  a third spectral reference portion associated with a third reflectivity that is different from the first reflectivity and the second reflectivity.

16. The device of claim 14, wherein at least one of the first reflectivity or the second reflectivity is greater than 60% reflectivity.

17. A device, comprising:
a filter comprising a first optical filter portion and a second optical filter portion,
  wherein the second optical filter portion comprises a plurality of reflective areas,
  wherein the plurality of reflective areas comprises:
    a first reflective area associated with a first reflectivity, and
    a second reflective area associated with a second reflectivity that is different from the first reflectivity; and
a blocking component separating the first optical filter portion and the second optical filter portion.

18. The device of claim 17, further comprising:
a spectral reference,
  wherein a first light beam is transmitted to the spectral reference and is reflected by the spectral reference towards the first reflective area, and
  wherein a second light beam is transmitted to the spectral reference and is reflected by the spectral reference towards the second reflective area.

19. The device of claim 17,
wherein a light beam is transmitted to the first reflective area,
wherein a first portion of the light beam is reflected by the first reflective area, and
wherein a second portion of the first light beam is filtered by the second optical filter portion.

20. The device of claim 17,
wherein a first light beam is transmitted to the first reflective area, and
wherein a second light beam that is transmitted to the first reflective area.

21. The device of claim 20, further comprising:
a light source configured to emit at least one of the first light beam or the second light beam.

22. The device of claim 20, wherein a light source is configured to emit the first light beam and the second light beam.

* * * * *

UNITED STATES PATENT AND TRADEMARK OFFICE
CERTIFICATE OF CORRECTION

| | |
|---|---|
| PATENT NO. | : 11,920,979 B2 |
| APPLICATION NO. | : 17/653299 |
| DATED | : March 5, 2024 |
| INVENTOR(S) | : William D. Houck et al. |

It is certified that error appears in the above-identified patent and that said Letters Patent is hereby corrected as shown below:

In the Claims

In Claim 19, Column 12, Line 53, "of the first light beam is filtered" should be changed to -- of the light beam is filtered --.

Signed and Sealed this
Second Day of April, 2024

Katherine Kelly Vidal
*Director of the United States Patent and Trademark Office*